(12) United States Patent  (10) Patent No.: US 7,451,317 B2
Oh et al.  (45) Date of Patent: Nov. 11, 2008

(54) APPARATUS FOR AND METHOD OF EMBEDDING WATERMARK INTO ORIGINAL INFORMATION, TRANSMITTING WATERMARKED INFORMATION, AND RECONSTRUCTING THE WATERMARK

(75) Inventors: Sang-heun Oh, Gyeonggi-do (KR);
Byung-jun Kim, Gyeonggi-do (KR);
Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 10/307,500

(22) Filed: Dec. 2, 2002

(65) Prior Publication Data
US 2003/0123661 A1 Jul. 3, 2003

(30) Foreign Application Priority Data
Dec. 3, 2001 (KR) ............................... 2001-75900

(51) Int. Cl.
*H04L 9/00* (2006.01)
*H04N 7/16* (2006.01)
*G06K 9/72* (2006.01)
(52) U.S. Cl. ................... 713/176; 380/201; 382/230; 382/232
(58) Field of Classification Search ............... 713/176; 380/201; 382/230, 232
See application file for complete search history.

(56) References Cited

U.S. PATENT DOCUMENTS

| 6,301,663 | B1 * | 10/2001 | Kato et al. | ............... 713/176 |
| 6,353,672 | B1 * | 3/2002 | Rhoads | ............... 382/100 |
| 6,385,329 | B1 * | 5/2002 | Sharma et al. | ............... 382/100 |
| 6,477,251 | B1 * | 11/2002 | Szrek et al. | ............... 380/46 |
| 6,487,301 | B1 * | 11/2002 | Zhao | ............... 382/100 |
| 6,504,941 | B2 * | 1/2003 | Wong | ............... 382/100 |
| 6,519,352 | B2 * | 2/2003 | Rhoads | ............... 382/100 |

(Continued)

FOREIGN PATENT DOCUMENTS

JP 2000-50049 2/2000

(Continued)

OTHER PUBLICATIONS

Wong, Ping Wah. "A Public Key Watermark for Image Verification and Authentication." Proceedings of the 1998 International Conference on Image Processing. Chicago, Oct. 4-7, 1998, pp. 455-459.

(Continued)

*Primary Examiner*—Nasser Moazzami
*Assistant Examiner*—Mohammad W Reza
(74) *Attorney, Agent, or Firm*—Stein, McEwen & Bui, LLP

(57) ABSTRACT

An apparatus for and method of embedding a watermark into original information, transmitting the watermarked information, and reconstructing the watermark from the transmitted watermarked information include embedding a portion of a plurality of components constituting the watermark into the original information, and using the remaining portion of the components as keys for reconstructing the watermark. According to the method, since a size of data to be embedded is greatly reduced, degradation of the watermarked information is prevented, and the information becomes more robust against hacking attacks or errors occurring in a variety of ways when transmitting the information.

49 Claims, 12 Drawing Sheets

U.S. PATENT DOCUMENTS

| | | | |
|---|---|---|---|
| 6,590,996 B1 * | 7/2003 | Reed et al. | 382/100 |
| 6,700,993 B1 * | 3/2004 | Minematsu | 382/100 |
| 6,883,982 B2 * | 4/2005 | Tokuda et al. | 400/76 |
| 6,940,995 B2 * | 9/2005 | Choi et al. | 382/100 |
| 7,007,166 B1 * | 2/2006 | Moskowitz et al. | 713/176 |
| 7,062,069 B2 * | 6/2006 | Rhoads | 382/100 |
| 2001/0020270 A1 | 9/2001 | Yeung et al. | |

FOREIGN PATENT DOCUMENTS

| | | |
|---|---|---|
| JP | 2000-165248 | 6/2000 |
| JP | 1256579 A | 6/2000 |
| WO | WO 99/63443 | 12/1999 |
| WO | WO 00/70605 | 11/2000 |
| WO | WO 01/67740 | 9/2001 |

OTHER PUBLICATIONS

Search Report issued in European Patent Application No. 02257144.2 on Apr. 21, 2006.

Proc. IEEK. Summer Conference 2001, vol. 24, No. 1, pp. 77-80: Sang-Wook Keem, Sang-Heum Oh, Yong-Jun Ryu, and Keyn-Young Lee; A Robust Watermarking Method Based On DWT (Discrete Wavelet Transform); Jun. 2000.

Office Action issued on Nov. 16, 2007 in the Korean Intellectual Property Office for Korean Patent Application No. 2001-75900.

* cited by examiner

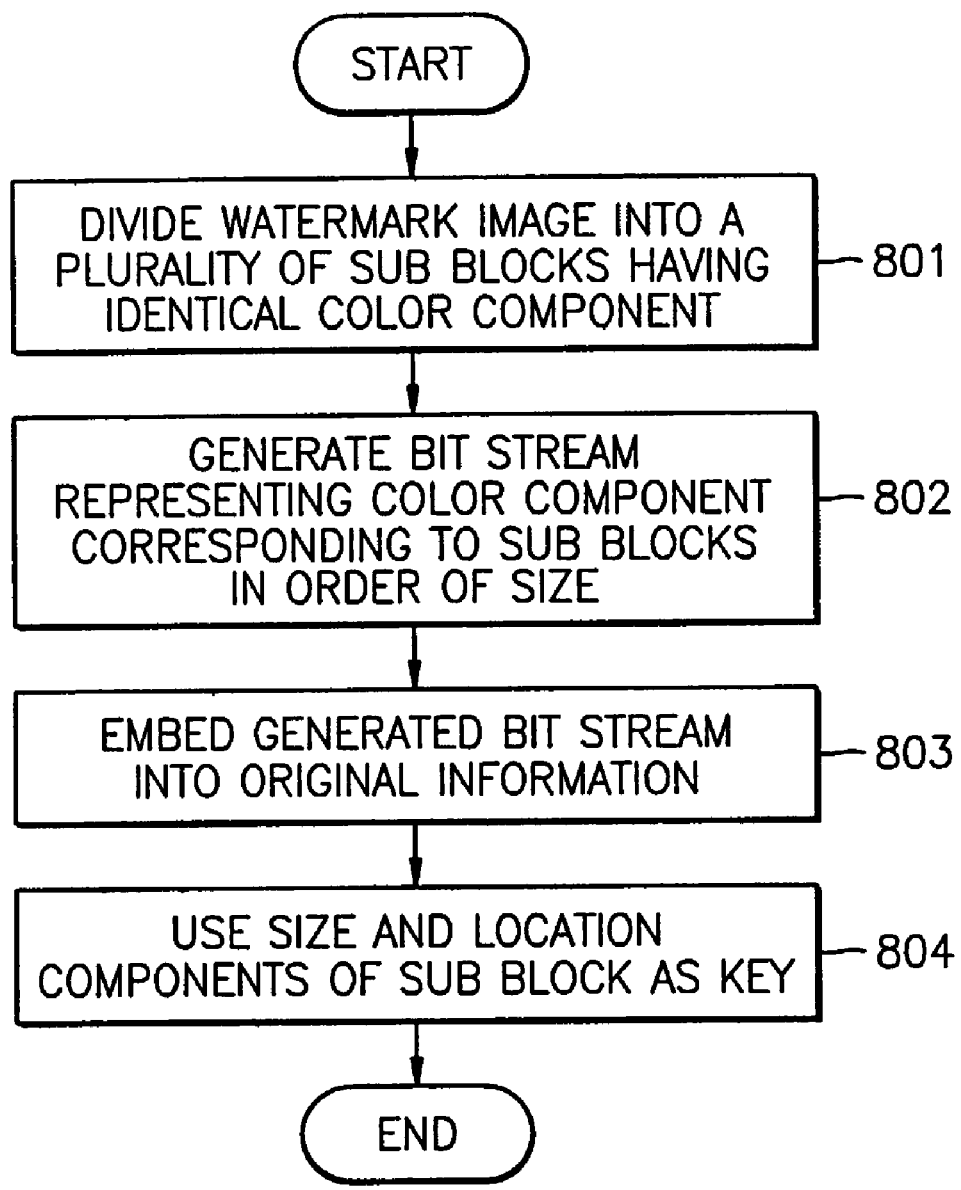

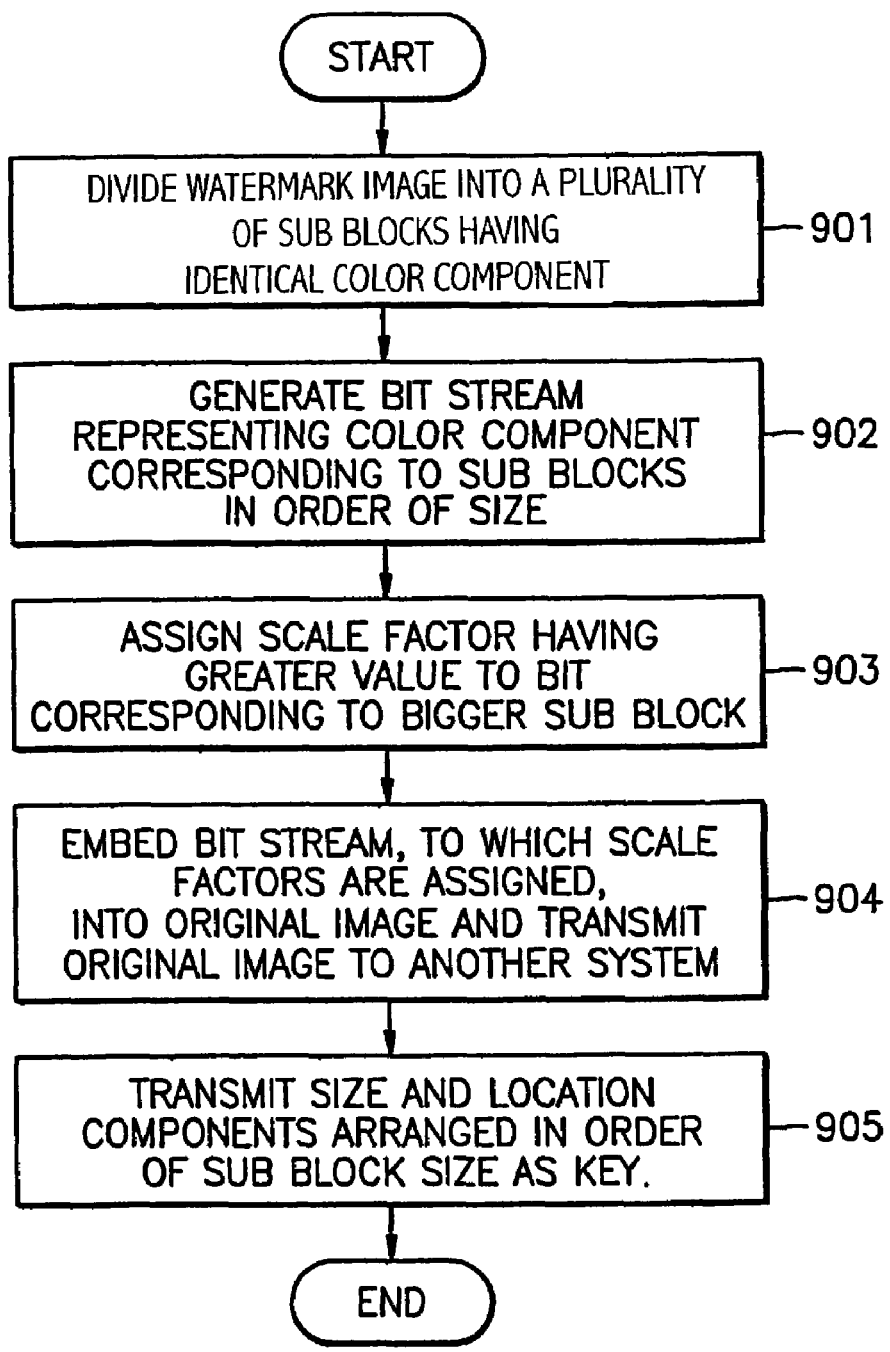

FIG. 10

```
START
  ↓
RECEIVE WATERMARKED IMAGE AND KEY — 1001
  ↓
EXTRACT BIT STREAM REPRESENTING
COLOR COMPONENT OF SUB BLOCKS — 1002
FROM WATERMARKED IMAGE
  ↓
EXTRACT SIZE AND LOCATION
COMPONENTS OF SUB BLOCKS FROM KEY — 1003
  ↓
RECONSTRUCT WATERMARK BY COMBINING
BIT STREAM REPRESENTING COLOR
COMPONENTS OF SUB BLOCKS AND — 1004
SIZE AND LOCATION COMPONENTS
  ↓
END
```

"DM LAB"     "SAMSUNG"     "Signature"

FIG. 12

| DM LAB | | SAMSUNG | | Signature | |
|---|---|---|---|---|---|
| SUB BLOCK SIZE | EA | SUB BLOCK SIZE | EA | SUB BLOCK SIZE | EA |
| 128x128 | 0 | 150x39 | 0 | 64x64 | 0 |
| 64x64 | 1 | 75x19 | 4 | 32x32 | 0 |
| 32x32 | 5 | 37x9 | 13 | 16x16 | 15 |
| 16x16 | 69 | 18x4 | 28 | 8x8 | 39 |
| 8x8 | 129 | 9x2 | 153 | 4x4 | 175 |
| 4x4 | 301 | 4x1 | 306 | 2x2 | 310 |
| 2x2 | 662 | 2x1 | 254 | | |
| TOTAL | 1167/16384 | 758/5850 | | 619/4096 | |
| RATE | 0.07 | 0.13 | | 0.15 | |

Lenna

Baboon

Camman

GAUSSIAN FILTER
(97.76% MATCHED)

2X2 MEDIAN FILTER
(95.96% MATCHED)

3X3 MEDIAN FILTER
(96.72% MATCHED)

SHARPENING
(96.83% MATCHED)

CROPPED Lenna

RECONSTRUCTED
WATERMARK

WARPED Lenna

RECONSTRUCTED
WATERMARK

APPARATUS FOR AND METHOD OF EMBEDDING WATERMARK INTO ORIGINAL INFORMATION, TRANSMITTING WATERMARKED INFORMATION, AND RECONSTRUCTING THE WATERMARK

CROSS REFERENCE TO RELATED APPLICATIONS

This application claims the benefit of Korean Application No. 2001-75900, filed Dec. 3, 2001, in the Korean Intellectual Property Office, the disclosure of which is incorporated herein by reference.

BACKGROUND OF THE INVENTION

1. Field of the Invention

The present invention relates to a watermark, and more particularly, to an apparatus for and method of embedding a watermark into original information, transmitting the watermarked information, and reconstructing the watermark.

2. Description of the Related Art

With the development of communications technologies based on networks, multimedia information is stored or transmitted more frequently in a digital form. When digital information is copied from original digital information, it is almost impossible to distinguish the copied digital information from the original digital information. Therefore, as a method to claim a right on the original information, identification information (hereinafter referred to as "a watermark") is embedded in the original information. Copyright information of the original information, a signature of a copyright holder, or a mark is mainly used as the watermark.

If a size of data (watermark) embedded into the original information increases, the watermarked information becomes robust against external hacking attacks while a quality of the watermarked information is degraded. If the size of the data embedded into the original information decreases, the result is the opposite. That is, there is a trade-off between the size of the watermark and the quality of the watermarked information. When text data is embedded as the watermark, there is no problem in maintaining the quality of the watermark information since an amount of the text data is usually less than 100 bits. However, when image data is embedded as the watermark, for example, even a binary image of 32×32 pixels, which is relatively small compared to other image data, needs the embedding of 1024 bits, and therefore the quality of the original information is degraded. However, necessity for embedding a watermark image has increased because the image data is more discriminating and user-friendly displayable than the text data.

In the prior art, a variety of watermark embedding methods have been disclosed. However, all the methods are mainly about where and how watermarked data is embedded into the original information.

SUMMARY OF THE INVENTION

To solve the above and other problems, it is an object of the present invention to provide an apparatus for and method of embedding a watermark into original information, transmitting the watermarked information, and reconstructing the watermark to reduce a size of embedded data greatly.

It is another object of the present invention to provide an apparatus for and a method of embedding a watermark into original information, transmitting the watermarked information, and reconstructing the watermark to reduce a size of embedded data greatly and make the watermark more robust with respect to hacking attacks against the watermark.

It is another object of the present invention to provide an apparatus for and a method of embedding a watermark into original information, transmitting the watermarked information, and reconstructing the watermark to reconstruct the watermark easily in a destination terminal, e.g., a receiving system receiving the watermarked information and reconstructing the watermark from the watermarked information.

Additional objects and advantageous of the invention will be set forth in part in the description which follows and, in part, will be obvious from the description, or may be learned by practice of the invention.

Accordingly, to accomplish the above and other objects, according to one aspect of the present invention, there is provided a method of embedding a watermark (watermark image) into original information. The method includes embedding a predetermined number (portion) of components constituting the watermark into the original information, and using the remaining number (portion) of the components as keys for reconstructing the watermark.

It is possible that the embedding of the predetermined number of the components includes dividing the watermark into a plurality of the components, and the dividing of the watermark includes dividing the watermark into a color component, a location component, and a size component.

It is also possible that the dividing of the watermark includes obtaining a plurality of sub blocks by dividing the watermark into areas having identical color components, generating a bit stream expressing the color components of the obtained sub blocks, and embedding the generated bit stream into the original information.

It is also possible that the obtaining of the sub blocks includes decomposing the watermark image into at least one binary image, and obtaining the sub blocks by dividing the obtained binary image into areas of which color components are expressed by an identical bit value.

To accomplish the above and other objects, according to another aspect of the present invention, there is provided a method of embedding a watermark image into original information. The method includes retrieving the watermark image while changing a size of an area, and if there is an area of which color component is expressed by an identical bit value, extracting the area as a sub block, generating a bit stream expressing the color components of extracted sub blocks, and embedding the generated bit stream into the original information.

It is possible that the retrieving of the watermark image includes decomposing the watermark image into at least one binary image, retrieving the watermark image while changing the size of the area, and if there is an area of which color component is expressed by the identical bit value, extracting the area as a sub block, and repeating the retrieving of the watermark image for the remaining binary images.

It is also possible that the generating of the bit stream includes arranging bit values corresponding to sub blocks in order of sub block size.

To accomplish the above and other objects, according to still another aspect of the present invention, there is provided a method of embedding a watermark (watermark image) into original information and transmitting the original information. The method includes embedding only a predetermined number (portion) of components constituting the watermark into watermarked original information and transmitting the watermarked original information, and transmitting the remaining portion of the components as keys needed for reconstructing the watermark from the watermarked original information.

It is possible that before the embedding of the predetermined portion of the components, the method further includes dividing the watermark into a plurality of the components.

To accomplish the above and other objects, according to still another aspect of the preset invention, there is provided a method of reconstructing a watermark. The method includes extracting a predetermined number (portion) of components constituting the watermark from watermarked original information, extracting the remaining portion of the components, and reconstructing the watermark by combining the remaining portion of the components received as keys with the extracted the predetermined portion of the components.

It is possible that the extracting of the predetermined number of the components includes extracting a bit stream expressing color components of the watermark from the watermarked original information.

It is also possible that the reconstructing of the watermark includes receiving location and size components of the watermark as keys and combining the keys and the color components and reconstructing the watermark.

To accomplish the above and other objects, according to still another aspect of the present invention, there is provided an apparatus for embedding a watermark (watermark image) into original information. The apparatus includes a watermark dividing unit which divides the watermark into a plurality of components, a watermark embedding unit which embeds a predetermined number (portion) of the components obtained through the watermark dividing unit, and a key generating unit which outputs the remaining portion of the components obtained through the watermark dividing unit as keys for reconstructing the watermark.

It is possible that the watermark dividing unit obtains a plurality of sub blocks by dividing the watermark image into areas having an identical color component and generates a bit stream expressing color components of the obtained sub blocks, and the watermark embedding unit embeds the bit stream generated by the watermark dividing unit into the original information.

BRIEF DESCRIPTION OF THE DRAWINGS

The above and other objects and advantages of the present invention will become more apparent by describing in detail preferred embodiments thereof with reference to the attached drawings in which:

FIG. 8 is a flowchart explaining another watermark embedding method according to another embodiment of the present invention;

FIG. 9 is a flowchart explaining a watermark transmitting method according another embodiment of the present invention;

FIG. 10 is a flowchart for explaining a watermark reconstructing method;

FIGS. 11A through 11C show examples of watermarked images;

FIG. 12 is a table comparing bit streams of color components extracted from the test images of FIG. 11;

DETAILED DESCRIPTION OF THE PREFERRED EMBODIMENTS

Figure 1:
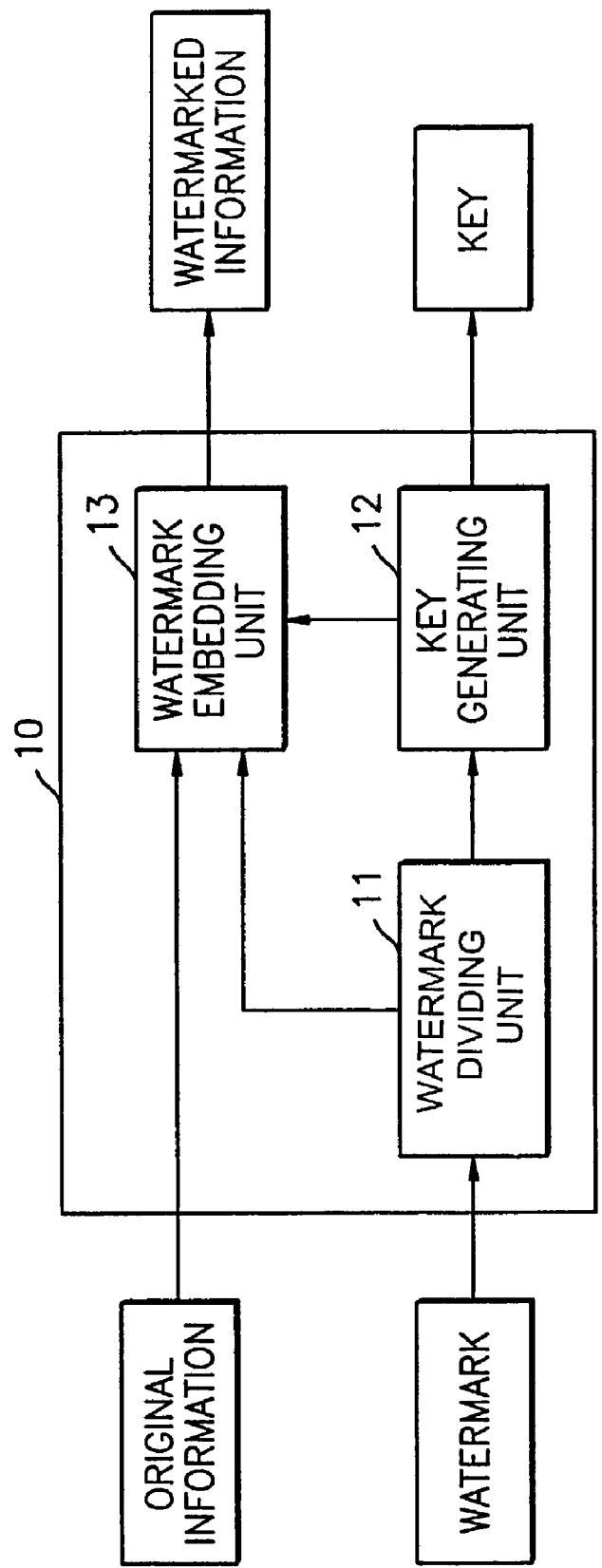
FIG. 1 is a diagram of a structure of a watermark embedding apparatus according to an embodiment of the present invention.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Referring to FIG. 1, a watermark embedding apparatus 10 according to an embodiment of the present invention receives original information and a watermark, embeds a part of data constituting the watermark into the original information, and outputs watermarked information and a key. The watermark embedding apparatus 10 includes a watermark decomposing (dividing) unit 11, a key generating unit 12, and a watermark embedding unit 13.

The watermark dividing unit 11 decomposes (divides) the watermark into a plurality of components: a portion of the components embedded into the original information; and a remaining portion of the components used as the key. The watermark may be expressed by one of a variety of expression methods. For example, if the watermark is watermarked data and is encrypted according to a predetermined encryption algorithm, the watermark is decomposed (divided) into a data component and a key component. If the watermark is video or sound data and is quantized according to the number of quantization bits assigned to each frequency band, the watermark may be decomposed into a quantized data component and the number of the quantization bits assigned to each frequency band. If the watermark is a voice signal, the watermark may be decomposed into an excitation source and a spectral shaping filter signal. In addition, the watermark may be decomposed into a formant signal and an envelope signal. If the watermark is the video or sound data, the watermark may be decomposed into a frequency component and a coefficient component.

That is, the watermark dividing unit 11 divides the watermark into two or more components that can be later combined to reconstruct the watermark. At this time, when a watermark image is input as the watermark and is not a binary image, the watermark image is converted into at least one binary image and then decomposed. For example, when the watermark image is a color image, the watermark image is divided into binary images by color, and each binary image is decomposed. In the present invention, a binary watermark image is decomposed into a color component, a location component, and a size component.

The key generating unit 12 generates a verification key. The verification key indicates data needed in extracting the watermark from the watermarked information or reconstructing the watermark from extracted data. In the present embodiment, the key generating unit 12 stores the remaining components, that is, the plurality of the remaining components obtained through the watermark dividing unit 11 except for the portion of the components embedded into the original information, as the key for reconstructing the watermark. When the watermarked information (watermarked image) is transmitted, the key generating unit 12 transmits the remaining components to a destination terminal separately from the watermarked information.

The watermark embedding unit 13 embeds some of the components generated by the watermark dividing unit 11 into the original information. The original information is usually an image (both a still image and a moving image) or sound including a voice signal. A method of embedding the watermark into original information may be selected in a variety of ways. Any of prior art watermark embedding methods may be used. For example, in one method, after the original information is converted into data in a frequency domain through Discrete Cosine Transform (DCT), Faster Fourier Transform (FFT), or Discrete Wavelet Transform (DWT), a watermark may be embedded into a part of the converted data which is less sensitive to human eyes.

In addition, when the watermark is embedded, at least a scaling factor may be assigned. The scaling factor is a factor adjusting for a trade-off between robustness of the watermark and a picture quality of the watermarked image when the original information is an image. When the scaling factors are assigned, values of the scaling factors may be different from one another. However, since the watermark should be perfectly reconstructed in the destination terminal, an embedding method using lossy compression may be not used. Also, considering errors caused by hacking attacks on the watermarked image or the embedded watermark, a compression method, such as a run-length method which can cause error propagation on the watermarked image, may be not used.

Figure 2:
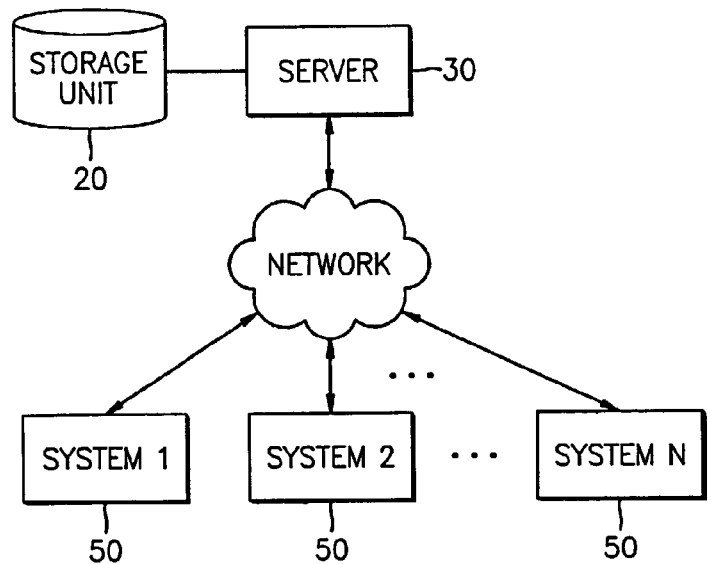
FIG. 2 is a diagram of a structure of an apparatus which stores or transmits watermarked original information and is added to the watermark embedding apparatus of FIG. 1.

FIG. 2 is a diagram of a structure of watermark transmitting apparatus, which is added to the watermark embedding apparatus of FIG. 1 and stores or transmits the watermarked original information.

Referring to FIG. 2, the watermark transmitting apparatus includes a storage unit 20 and a server 30. The storage unit 20 stores the watermarked information and the key. The storage unit 20 may be implemented as a general storage unit storing the watermarked information and a security storage unit storing keys. The server 30 transmits a signal including the watermarked information and the key to another system 50 through a network. The network may be a Local Area Network (LAN) or a Wide Area Network (WAN) such as the Internet or may include both. The system 50 can extract and reconstruct the watermark from the watermarked information by using the received key. The system 50 may have a watermark reconstructing unit. The watermark reconstructing unit includes a terminal unit receiving the signal, a separating unit separating the key from the signal, an extracting unit extracting the portion of the components of the watermark from the watermarked original information, and a combining unit combining the separated key with the extracted portion of the components to reconstruct of the watermark. In addition, with a display apparatus (not shown) and/or a printing apparatus (not shown), the system 50 can display or print the watermarked information and the reconstructed watermark.

Figure 3:
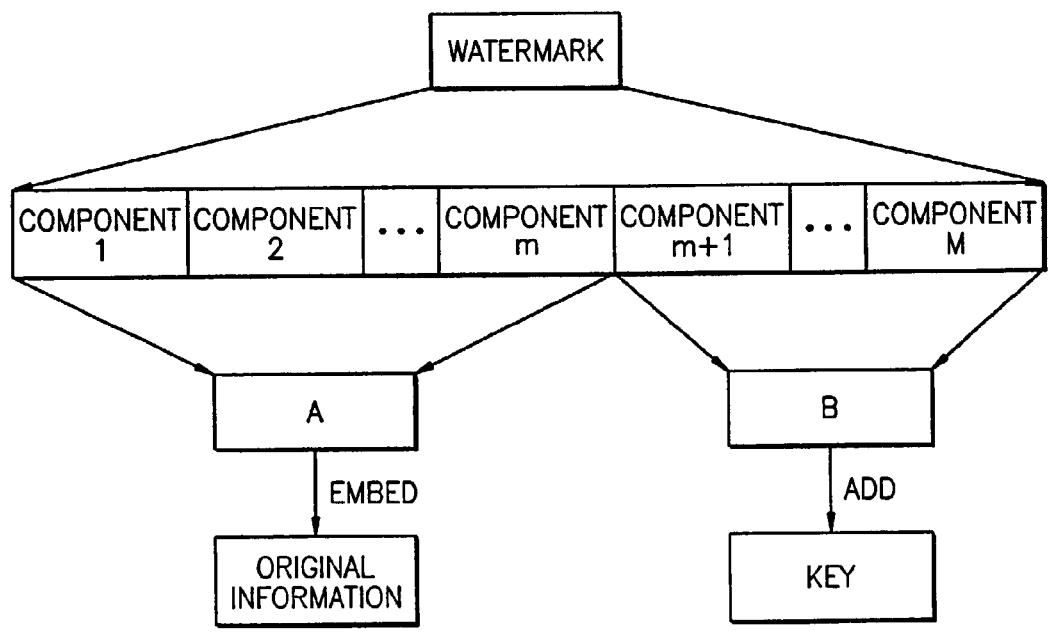
FIG. 3 is a reference diagram showing a process of decomposing the watermark according to another embodiment of the present invention.
Figure 4:
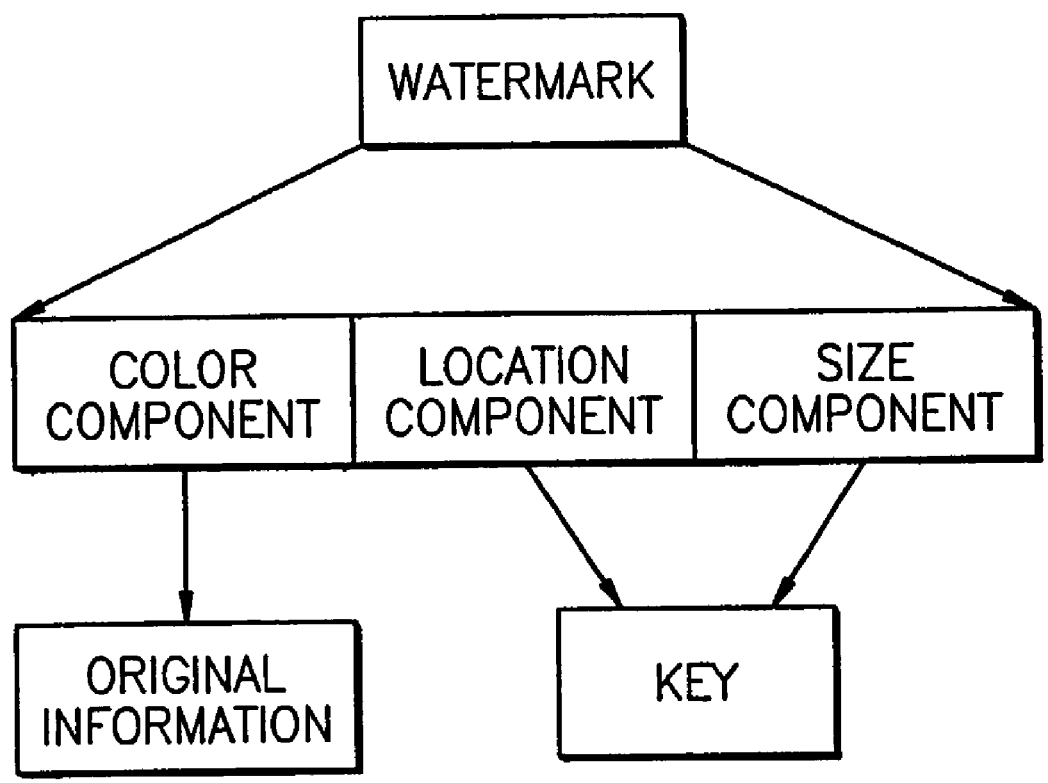
FIG. 4 is a reference diagram showing another process of decomposing the watermark according to another embodiment of the present invention.

FIGS. 3 and 4 are reference diagrams showing a process of decomposing (dividing) the watermark according to embodiments of the present invention.

Referring to FIG. 3, the watermark dividing unit 11 divides the watermark into M components (where M is an integer). Among M components, components A, which is m components (m is an integer less than M), are embedded as the watermark into the original information, and components B, which are the remaining components (M-m), are used as the key.

Referring to FIG. 4, according to another embodiment of the present invention, the watermark image is decomposed into a color component, a location component, and a size component. Then the color component is embedded into the original information, and the location component and the size component are used as keys.

Figure 5A:
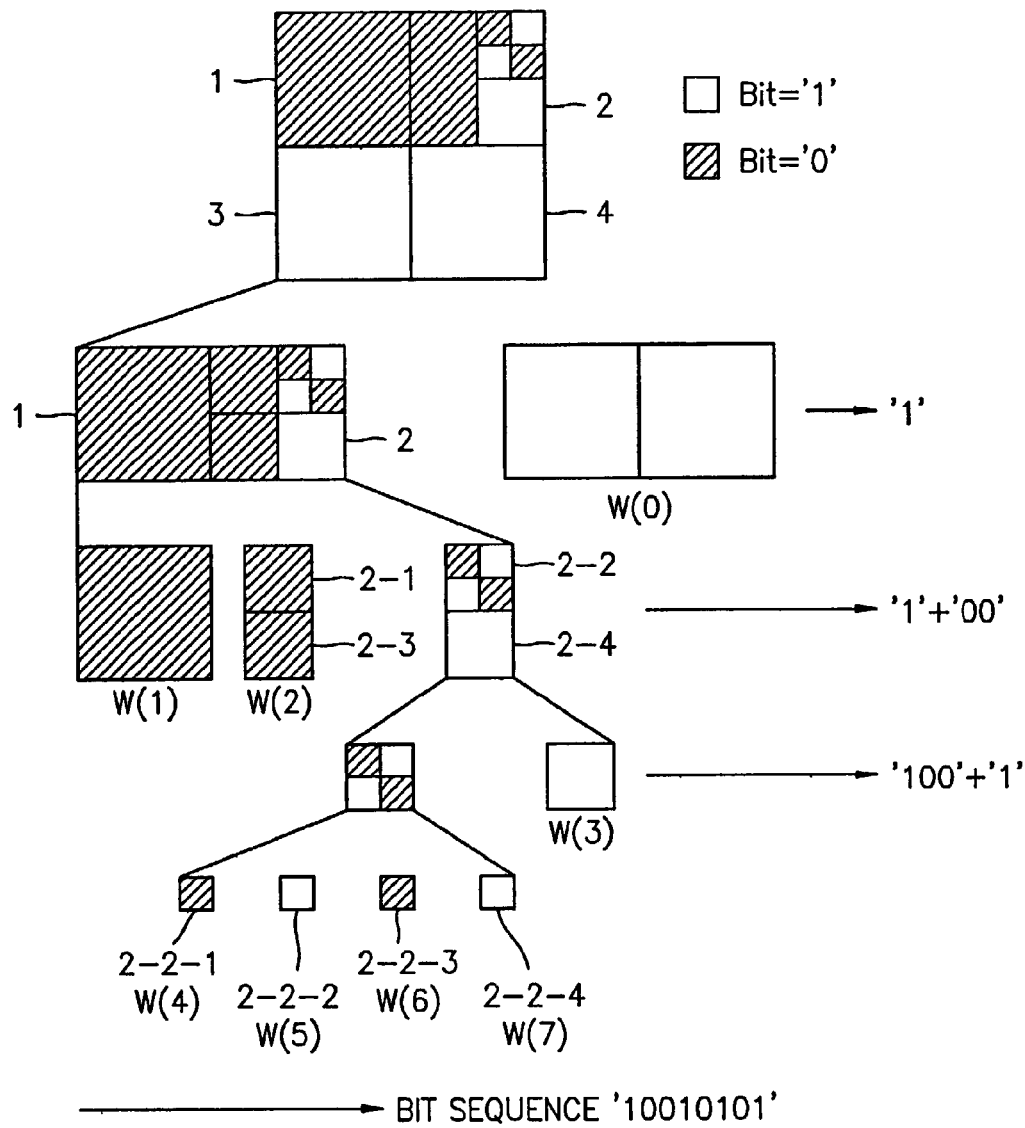
FIGS. 5A and 5B are reference diagrams showing another process of decomposing a watermarked image according to another embodiment of the present invention.
Figure 5B:
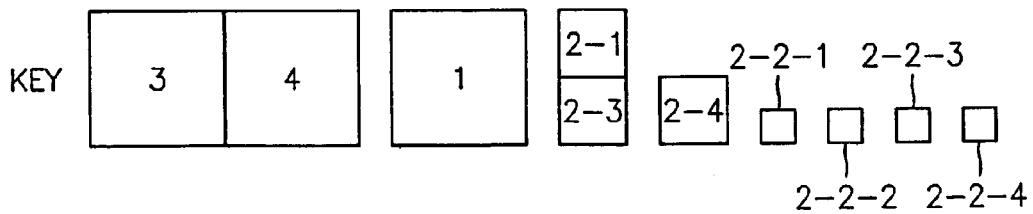

FIGS. 5A and 5B are reference diagrams showing a process of dividing the watermark image according to another embodiment of the present invention.

As described above, the watermark dividing unit 11 divides the watermark image into the binary images and then divides the binary images into areas. Referring to FIG. 5A, the binary images include 4 areas represented by reference numbers 1 through 4. Hatched (shaded) line parts indicate bit '0', and blanked (non-shaded) parts indicate bit '1'. Since areas 3 and 4 have the same color component, that is, the color components are expressed by the same bit, areas 3 and 4 are extracted as sub block W(0). Next, area 1 is extracted as sub block W(1). Then, in area 2, areas 2-1 and 2-3, in which color components are expressed by the same bit, are extracted as sub block W(2). In the remaining area, area 2-4, in which the color component is expressed by the same bit, is extracted as sub block W(3). Then, areas 2-2-1, 2-2-2, 2-2-3, and 2-2-4 are extracted as sub blocks W(4), W(5), W(6), and W(7), respectively. If bits corresponding to the sub blocks in order of extraction are arranged, a bit stream '10010101' is obtained. That is, '10010101' is a bit stream expressing color components.

Referring to FIG. 5B, the size and location components which are obtained in the watermark image decomposing (dividing) process of FIG. 5A, are shown. A size of a rectangle (hatched line or blanked parts) indicates the size component of a corresponding sub block, and the reference numbers marked in the rectangles indicate the location components of corresponding sub blocks. The size and location components may be expressed in a variety of ways.

Figure 6:
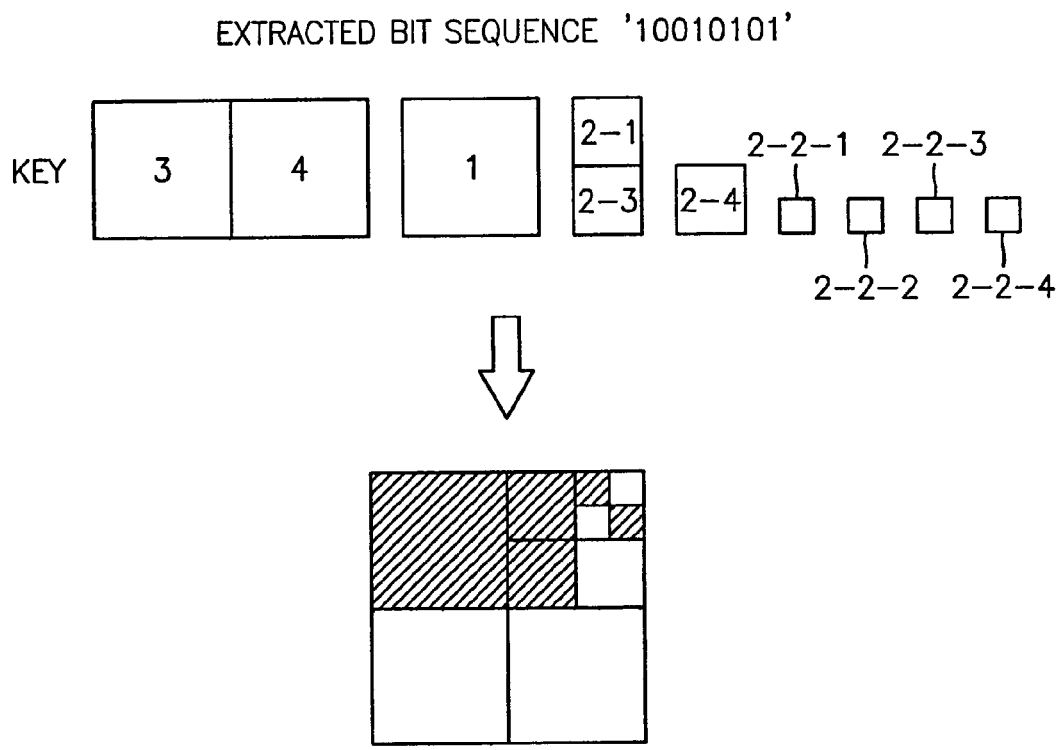
FIG. 6 is a reference diagram showing a process of reconstructing a watermark in another system.

FIG. 6 is a reference diagram showing a process for reconstructing the watermark in another system. Referring to FIG. 6, the system 50 of FIG. 2 extracts a bit stream '10010101' that indicates the color component from the watermarked image (watermarked information) and combines the size and location components received as the keys with the extract bit stream to reconstruct the watermark (watermark image).

Based on the structure described above, a watermark embedding method and transmitting method will now be explained.

Figure 7:
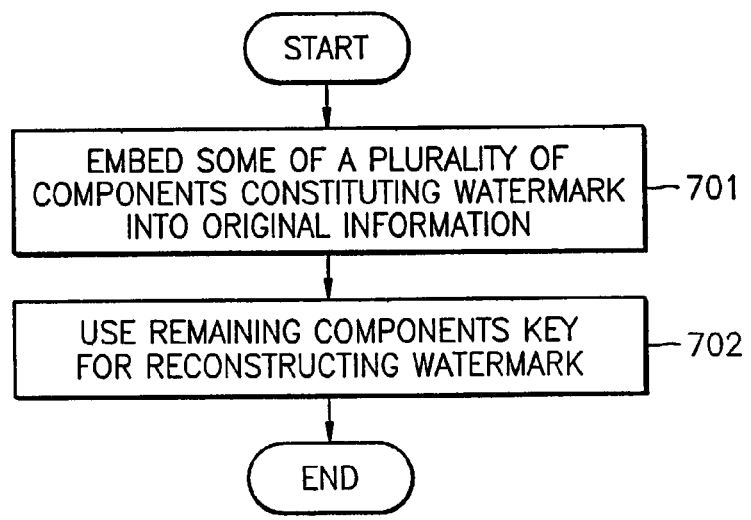
FIG. 7 is a flowchart explaining a watermark embedding method according to another embodiment of the present invention.

FIG. 7 is a flowchart explaining the watermark embedding method according to an embodiment of the present invention.

Referring to FIG. 7, the watermark embedding apparatus 10 embeds some of the components constituting the watermark into the original information in operation 701 and uses the remaining components as the keys for reconstructing the watermark in operation 702. Here, using the remaining components as the keys means storing the remaining components as the keys or transmitting the remaining components as the keys when the watermarked information obtained in operation 701 is transmitted to the destination terminal.

FIG. 8 is a flowchart explaining the watermark embedding method according to another embodiment of the present invention.

Referring to FIG. 8, the watermark embedding apparatus 10 divides the watermark image into the sub blocks having identical color components in 801 and generates the bit stream expressing the color components of the obtained sub blocks in operation 802. More specifically, when the number of pixels in the binary image constituting the watermark image is X×Y=(x,y), the watermark embedding apparatus 10 describes the number of pixels constituting a sub block as (x, y) and initializes a k value as '0'. Next, the watermark embedding apparatus 10 searches the entire area of the binary image, and if there is an area, which is expressed by an identical bit value, and has the same size as the sub block that is set first, extracts the area as sub block W(k). If all bits in the extracted sub block is '1', W(k) is 1, and if all bits in the extracted sub block is '0', W(k) is 0. If the sub block is extracted, the k value increases by 1. Again, by changing the size of the sub block into (x/2, y) and (x, y/2), the watermark embedding apparatus 10 searches and retrieves the watermark image. At this time, the extracted sub block is excluded from the search. Until (x, y)=(1, 1), by reducing the number of pixels in width or in length by half, search and retrieval is repeatedly performed to extract a corresponding sub block. If a bit obtained from each sub block is arranged in order of sub block size, the bit stream is generated.

The watermark embedding apparatus 10 embeds the obtained bit stream into the original information in operation 803. As a method of embedding the bit stream into the original information, an applicable prior art watermark embedding method may be used. In addition, by giving different scale factors to the bits, the bits may be embedded. A large scale factor is given to an important component while a small scale factor is given to a less important component. For example, the large scale factor is assigned to a bit of the sub block having a relatively large size while the small scale factor is assigned to a bit of the sub block having a relatively small size. Meanwhile, the size and location components of the sub block are used as the keys in operation 804.

FIG. 9 is a flowchart explaining the watermark transmitting method according another embodiment of the present invention.

Referring to FIG. 9, the watermark transmitting apparatus divides the watermark image (watermark) into the sub blocks having identical color components in operation 901 and generates a bit stream expressing the color components corresponding to the sub blocks in order of size in operation 902. These operations are the same as operations 801 and 802 of FIG. 8. In addition, a scale factor having a greater value is given to the sub block which is relatively large in operation 903. Next, the watermark transmitting apparatus embeds a bit stream, to which scale factors are assigned, into the original image and transmits the original image to another system 50 in operation 904. The original image includes both a still image and a moving image. Likewise, as a method of embedding the bit stream into the original image, an applicable prior art method may be used. In addition, by giving the different scale factors to the bits, the bits may be embedded. A large scale factor is given to an important component while a small scale factor is given to a less important component. For example, the large scale factor is assigned to a bit of a sub block having the relatively large size while the small scale factor is assigned to a bit of a sub block having the relatively small size. Meanwhile, the size and location components are arranged in order of sub block size, and then transmitted as the keys to another system 50 in operation 905.

FIG. 10 is a flowchart explaining a watermark reconstructing method. Referring to FIG. 10, the system 50 receives the watermarked image and the key through the network in operation 1001 and extracts the bit stream expressing the color components of the sub blocks from the watermarked image in operation 1002. Meanwhile, the system 50 extracts the size and location components of sub blocks from the received keys in operation 1003. According to the bit stream extracted in operation 1002 and the size components extracted in operation 1003, the sub blocks having corresponding sizes and bit values are reconstructed. Finally, referring to the location components, by rearranging the reconstructed sub blocks, the watermark image is reconstructed in operation 1004.

As described above, according to the present invention, in order to reconstruct the watermark image, the embedded components and the keys should be accurate. This accuracy guarantees the robustness of the methods and apparatuses for embedding and transmitting watermarks. For example, if the location and size information (components) of other watermark images is received as the keys, the number of the sub blocks does not match and the watermark image cannot be reconstructed. Even when the bit stream expressing the embedded components is extracted with an algorithm for embedding the watermark, if the size and location components of the sub blocks are not known, the watermark image cannot be reconstructed correctly. Even though the keys are hacked, if the embedded color component is not known, the bits of the sub blocks cannot be filled and therefore reconstruction is impossible.

The results of experiments on the performance of the watermark embedding apparatus 10 according to the present invention are as follows. First, the apparatus used in the experiments employed a method in which the original image was DWT converted to obtain DWT coefficients, and if the bit value of the bit stream to be embedded was '0', the corresponding coefficient was replaced by a threshold value T1, and if the bit value was '1', the corresponding coefficient was replaced by a threshold value T2. A factor, which determines a distance between T1 and T2, is a scale factor. The scale factor may be determined in a variety of ways. The present experiment employed a method disclosed by Sang-Wook Keem, Sang-Heum Oh, Yong-Jun Ryu, and Keyn-Young Lee in "A Robust digital watermarking method based on DWT" in Proc. IEEK. Summer Conference 2001, vol 24, No. 1, pp. 77-80, June 2001, in which the scale factor is $\alpha$, and if $0.8 \leq \alpha \leq 1$, $\Delta\alpha=0.2$; if $0.45 \leq \alpha \leq 0.6$, $\Delta\alpha=0.15$; and if $0.1 \leq \alpha \leq 0.3$, $\Delta\alpha=0.1$.

FIGS. 11A through 11C show examples of watermark images used for experiment. Referring to FIGS. 11A through 11C, "DM LAB" needs 128×128 bits/pixel in FIG. 11A, "SAMSUNG" needs 150×39 bits/pixel in FIG. 11B, and "Signature" needs 64×64 bits/pixel in FIG. 11C.

FIG. 12 is a table for comparing bit streams of the color components extracted according to the present invention from the test images of FIGS. 11A through 11C. Referring to FIG. 12, it is shown that "DM LAB" can be expressed by 1167 bits, which is a 90% decrease from the prior art which use 16384 bits. "SAMSUNG" and "Signature" can be expressed by an 85% decrease in bits.

Figure 13A:
FIGS. 13A through 13C show original images.
Figure 13B:
Figure 13C:

FIGS. 13A through 13C show original images used for experiment. Referring to FIGS. 13A through 13C, each of "Lenna", "Baboon", and "Camman" needs 256×256 pixels.

Figure 14:
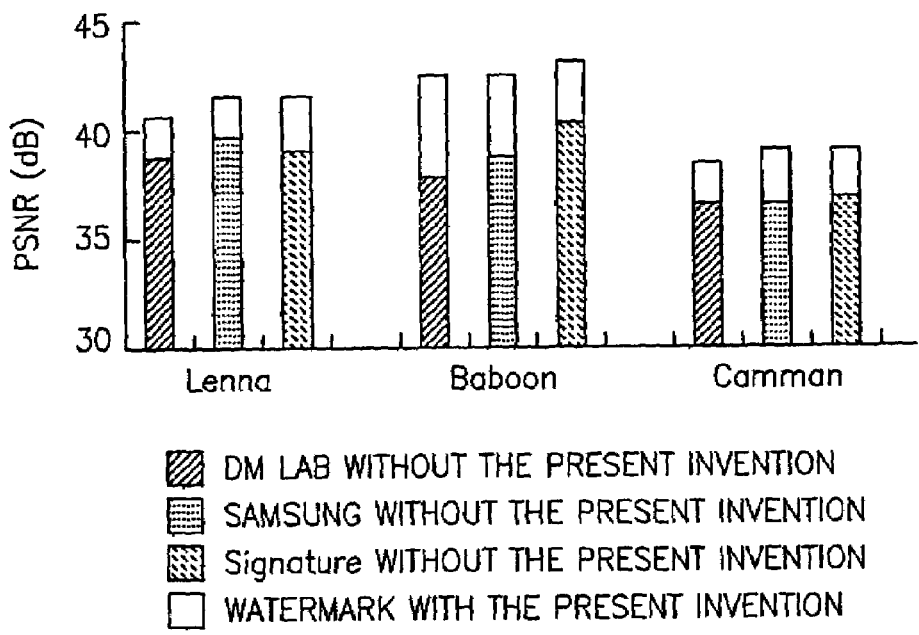
FIG. 14 is a graph comparing the present invention and the picture quality of images obtained according to the prior art, respectively.

FIG. 14 is a graph comparing the picture quality of watermark images obtained according to the present invention and the picture quality of images obtained according to the prior art. According to the method described by Sang-Wook Keem, Sang-Heum Oh, Yong-Jun Ryu, and Keyn-Young Lee in "A Robust digital watermarking method based on DWT" in Proc. IEEK. Summer Conference 2001, vol 24, No. 1, pp. 77-80, June 2001, the watermark is embedded three times. However, since three times embedding of the watermark image with a large amount of data such as "DM LAB" without compression is impossible, the watermark image is only embedded once.

Referring to FIG. 14, the picture quality improves a minimum of 1.8 dB and a maximum of 5.63 dB when the watermark image is embedded according to the method of the present invention. Hence, PSNR means Pick Signal to Noise Ratio.

Figure 15:
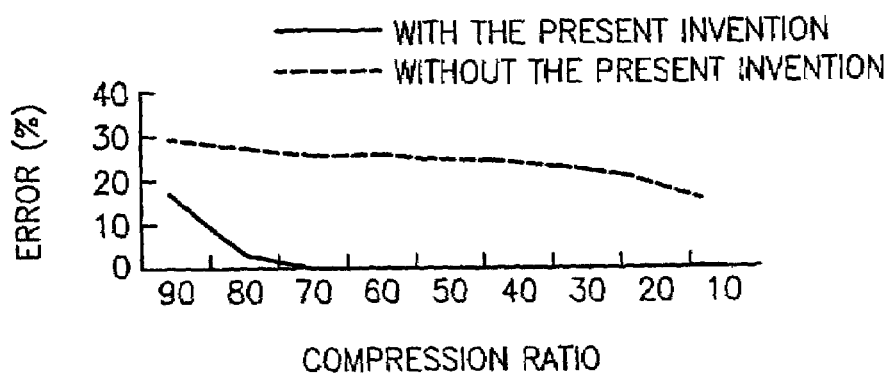
FIG. 15 is a graph showing robustness of an image watermarked according to the present invention.

FIG. 15 is a graph showing the robustness of an image watermarked according to the present invention.

Referring to FIG. 15, after "DM LAB" is embedded into "Baboon" and then compressed, by changing the compression ratio from 10% to 90%, JPEG compression is performed. As the results, the method according to the present invention showed 2.33% error (381 bits among 16384 bits), and the method according to the prior art showed 22.86% error (3745 bits among 16384 bits). This shows that the present invention reduces the error generation ratio ten times more than the prior art.

Figure 16A:
FIGS. 16A through 16D are reference diagrams showing filtering robustness of an image watermarked according to the present invention.
Figure 16B:
Figure 16C:
Figure 16D:
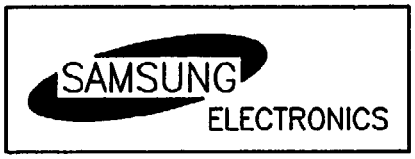

FIGS. 16A through 16D show reference diagrams showing the filtering robustness of the image watermarked according to the present invention. Referring to FIG. 16, after "SAMSUNG" is embedded into "Camman" and then JPEG-compressed, the robustness of "Stirmark Attack" filtering was experimented on, and the results are shown. FIG. 16A shows an extracted watermark image after passing Gaussian filter, FIG. 16B shows an extracted watermark image after passing a 2×2 median filter, FIG. 16C shows an extracted watermark image after passing a 3×3 median filter, and FIG. 16D shows an extracted watermark image when the edge of the 3×3 watermarked image is emphasized. All diagrams show over a 95% reconstruction ratio.

Figure 17A:
FIGS. 17A and 17B are reference diagrams showing cropping robustness of the image watermarked according to the present invention.
Figure 17B:

FIGS. 17A and 17B are reference diagrams showing the cropping robustness of the image watermarked according to the present invention.

FIG. 17A shows a cropped "Lenna," and FIG. 17B shows watermarked image "Signature" reconstructed from the cropped "Lenna" of FIG. 17A. Despite this cropping attack, "Signature" shows a robustness of over 97% reconstruction.

Figure 18A:
FIGS. 18A and 18B are reference diagrams showing warping robustness of the image watermarked according to the present invention.
Figure 18B:

FIGS. 18A and 18B are reference diagrams showing the warping robustness of an image watermarked according to the present invention. FIG. 18A shows a warped "Lenna," and FIG. 18B shows watermarked image "SAMSUNG" reconstructed from the warped "Lenna" of FIG. 18A. Despite this warping attack, "SAMSUNG" shows a robustness of over 97% reconstruction.

As described above, since the size of data to be embedded is greatly reduced according to the present invention, degradation of watermarked information is prevented and the information becomes more robust against hacking attacks occurring in a variety of ways during transmitting the watermarked information to the destination terminal. That is, the watermark to be embedded is decomposed into a plurality of components, and just some of the components are embedded such that the picture quality of the watermarked information or the original information is improved, and the remaining components are transmitted as keys such that the watermarked information becomes more robust against the hacking attacks. This is because in the destination terminal, only a combination of some components extracted from the watermarked original information and the remaining components transmitted as keys can completely reconstruct the watermark.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of embedding a watermark into original information, the method comprising:
    embedding a portion of a plurality of components constituting the watermark into the original information to generate watermarked original information; and
    using the remaining portion of the components as a key for reconstructing the watermark from the watermarked original information.

2. The method of claim 1, wherein the embedding of the portion of the components comprises:
    dividing the watermark into the plurality of the components.

3. The method of claim 2, wherein the watermark is a watermark image, and the dividing of the watermark comprises:
    dividing the watermark image into a color component, a location component, and a size component.

4. The method of claim 3, wherein the dividing of the watermark image comprises:
    obtaining a plurality of sub blocks by dividing the watermark image into areas having identical color components;
    generating a bit stream expressing the color components of the obtained sub blocks; and
    embedding the generated bit stream into the original information.

5. The method of claim 4, wherein the obtaining of the sub blocks comprises:
    dividing the watermark image into at least one binary image; and
    obtaining a plurality of sub blocks by dividing the obtained binary image into areas of which color components are expressed by an identical bit value.

6. The method of claim 1 wherein the embedding of the portion of the components comprises:
    dividing the watermark into an encrypted watermark according to a predetermined encryption algorithm and an encryption key.

7. The method of claim 1, wherein the embedding of the portion of the components comprises:
    dividing the watermark into data quantized and the number of quantization bits according to the number of the quantization bits assigned to each frequency band.

8. The method of claim 1, wherein the embedding of a portion of a plurality of components further comprises:

retrieving the watermark image while changing a size of an area, and if there is an area of which color component is expressed by an identical bit value to other areas, extracting the area as a sub block;

generating a bit stream expressing color components of extracted sub blocks; and embedding the generated bit stream into the original information to generate the watermarked original information.

9. The method of claim 8, wherein the retrieving of the watermark image comprises:

converting the watermark image into at least one binary image;

retrieving the binary image while changing the size of the area, and if there is the area of which the color component is expressed by the identical bit value to that of the other areas of the binary image, extracting the area as the sub block; and repeating the retrieving of the binary image for the remaining area of the binary image.

10. The method of claim 8, wherein the generating of the bit stream comprises:

arranging bit values corresponding to the sub blocks in order of sub block size.

11. The method of claim 8, wherein the embedding of the generated bit stream comprises:

assigning a scaling factor to the bit stream.

12. The method of claim 8, further comprising using components of the watermark other than the color component as the key needed to reconstruct the watermark.

13. The method of claim 11 wherein the embedding of the generated bit stream comprises:

differently assigning the scaling factor of a predetermined number of bits to the bit stream according to the sub blocks.

14. The method of claim 13, wherein the scaling factor comprises a first scaling factor and a second scaling factor greater than the first scaling factor, and the embedding of the generated bit stream comprises:

assigning the second scaling factor to the bit stream when a size of the sub block is larger than other sub blocks.

15. A method of embedding a watermark into original information and transmitting the original information, the method comprising:

embedding a portion of a plurality of components constituting the watermark into the original information and transmitting the watermarked original information; and transmitting the remaining portion of the components as a key needed for reconstructing the watermark from the watermarked original information.

16. The method of claim 15, further comprising:

dividing the watermark into the components.

17. The method of claim 16, wherein the watermark is a watermark image, and the dividing of the watermark comprises:

dividing the watermark image into a color component, a location component, and a size component.

18. The method of claim 17, wherein the dividing of the watermark image comprises:

obtaining a plurality of sub blocks by dividing the watermark image into areas having identical color components;

generating a first bit stream expressing the color components of the obtained sub blocks; and generating a second bit stream expressing the location and size components of the obtained sub blocks.

19. The method of claim 18, wherein the obtaining of the sub blocks comprises:

dividing the watermarked image into at least one binary image; and obtaining a plurality of sub blocks by dividing the obtained binary image into areas of which color components are expressed by an identical bit value to each other.

20. The method of claim 18, wherein step the generating of the first bit stream comprises:

arranging bit values corresponding to the sub blocks in order of sub block size.

21. The method of claim 18, wherein the embedding of the portion of the components comprises:

transmitting the second bit stream expressing the location and size components as the key for reconstructing the watermark from the watermarked original information.

22. A method of reconstructing a watermark from watermarked original information, the method comprising:

extracting a portion of a plurality of components constituting the watermark from the watermarked original information; and reconstructing the watermark by combining the remaining portion of the components received as a key with the portion of the components.

23. The method of claim 22, wherein the extracting of the portion of the components comprises:

extracting a bit stream expressing color components of the watermark from the watermarked original information.

24. The method of claim 23, wherein the reconstructing of the watermark comprises:

receiving location and size components of the watermark as the key; and combining the key and the color components to reconstruct the watermark.

25. An apparatus for embedding a watermark into original information, the apparatus comprising:

a watermark dividing unit which divides the watermark into a plurality of components;

a watermark embedding unit which embeds a portion of the components obtained through the watermark dividing unit into original information to generate watermarked original information; and a key generating unit which outputs the remaining portion of the components obtained through the watermark dividing unit as a key for reconstructing the watermark.

26. The apparatus of claim 25, wherein the watermark is a watermark image, and the watermark dividing unit divides the watermark image into a color component, a location component, and a size component.

27. The apparatus of claim 25, wherein the watermark is a watermark image, and the watermark dividing unit obtains a plurality of sub blocks by dividing the watermark image into areas having an identical color component and generates a bit stream expressing color components of the obtained sub blocks, and the watermark embedding unit embeds the bit stream generated by the watermark dividing unit into the original information.

28. The apparatus of claim 27, wherein the watermark dividing unit generates a bit stream expressing the color components by arranging bit values corresponding to the sub blocks in order of sub block size.

29. The apparatus of claim 25, wherein the watermark is a watermark image, and the watermark dividing unit retrieves the watermark image while changing a size of an area, and if there is an area of which color component is expressed by an identical bit value, extracts the area as a sub block.

30. The apparatus of claim 25, wherein the watermark is a watermark image, and the watermark dividing unit converts the watermark image into at least one binary image and divides the converted binary image into a color component, a location component, and a size component.

31. The apparatus of claim 30, wherein the watermark dividing unit obtains a plurality of sub blocks by dividing the binary image into areas having an identical color component and generates a bit stream expressing the color components of the obtained sub blocks, and the watermark embedding unit embeds the bit stream generated by watermark dividing unit into the original information.

32. The apparatus of claim 31, wherein the watermark dividing unit generates the bit stream expressing the color components by arranging bit values corresponding to the sub blocks in order of sub block size.

33. The apparatus of claim 30, wherein the watermark dividing unit retrieves the binary image while changing a size of an area, and if there is an area of which the color component is expressed by an identical bit value to that of other areas, extracts the area as a sub block.

34. The apparatus of claim 30 wherein the watermark embedding unit embeds a bit stream into the original information after assigning a scaling factor to the bit stream.

35. The apparatus of claim 34, wherein the watermark embedding unit embeds the bit stream after assigning a different scaling factor of at least a predetermined number of bits to the bit stream according to the sub blocks.

36. The apparatus of claim 35, wherein the scaling factor comprises a first scaling factor and a second scaling factor greater than the first scaling factor, and the watermark embedding unit assigns the second scaling factor of the bits to the bit stream when the sub block is larger than other sub block having the first scaling factor.

37. The apparatus of claim 25, wherein the watermark comprises a watermark image, and the watermark dividing unit divides the watermark image into another watermark image encrypted according to a predetermined encryption algorithm and into an encryption key.

38. The apparatus of claim 25, wherein the watermark comprises a watermark sound, and the watermark dividing unit divides the watermark sound into data which is quantized according to the number of quantization bits assigned to each frequency band and into the number of the assigned quantization bits.

39. An apparatus for reconstructing a watermark from a signal having watermarked original information, comprising:
a terminal unit receiving the signal having the watermarked original information and a key, the watermarked original information including original information and a first portion of components of the watermark embedded into the original information, the key representing a second portion of the components of the watermark transmitted together;
a separating unit separating the key from the signal;
an extracting unit extracting the first portion of the components of the watermark from the watermarked original information; and
a combining unit combining the separated key with the extracted portion of the components to reconstruct the watermark.

40. The apparatus of claim 39, wherein the first portion of the components of the watermark comprises a bit stream expressing a color component of the watermark, and the extracting unit extracts the bit stream from the watermarked original information.

41. The apparatus of 40, wherein the key comprises a location component and a size component, and separating unit separate the location component and the size component relating to the color component of the watermark from the signal as the key.

42. The apparatus of claim 40, wherein the combining unit combines the color component, the location component, and the size component to reconstruct the watermark.

43. The apparatus of claim 40, wherein the first portion is a color information of the watermark, and the second portion is a location component and a size information of the watermark.

44. The apparatus of claim 40, wherein the first portion is one of a color information, a location component and a size information of the watermark, and the second portion is remaining ones of the color information, the location component and the size information of the watermark.

45. The apparatus of claim 40, wherein the watermark comprises video and sound data, and first portion and the second portion are a quantized data component and the number of quantized bits assigned to each frequency band corresponding to the quantized data component, respectively.

46. The apparatus of claim 40, wherein the watermark comprises video and sound data, and the first portion and the second portion are a frequency component and a coefficient component, respectively.

47. The apparatus of claim 40, wherein the watermark comprises a voice signal, and the first portion and the second portion are an excitation source and a spectral shaping filter signal, respectively.

48. The apparatus of claim 40, wherein the first portion and the second portion are a formant signal and an envelope signal, respectively.

49. The apparatus of claim 40, wherein the first portion and the second portion are a first number of the components and a second number of the components, respectively, and the components comprises a total number of components, which is a sum of the first number and the second number.

* * * * *